UNITED STATES PATENT OFFICE.

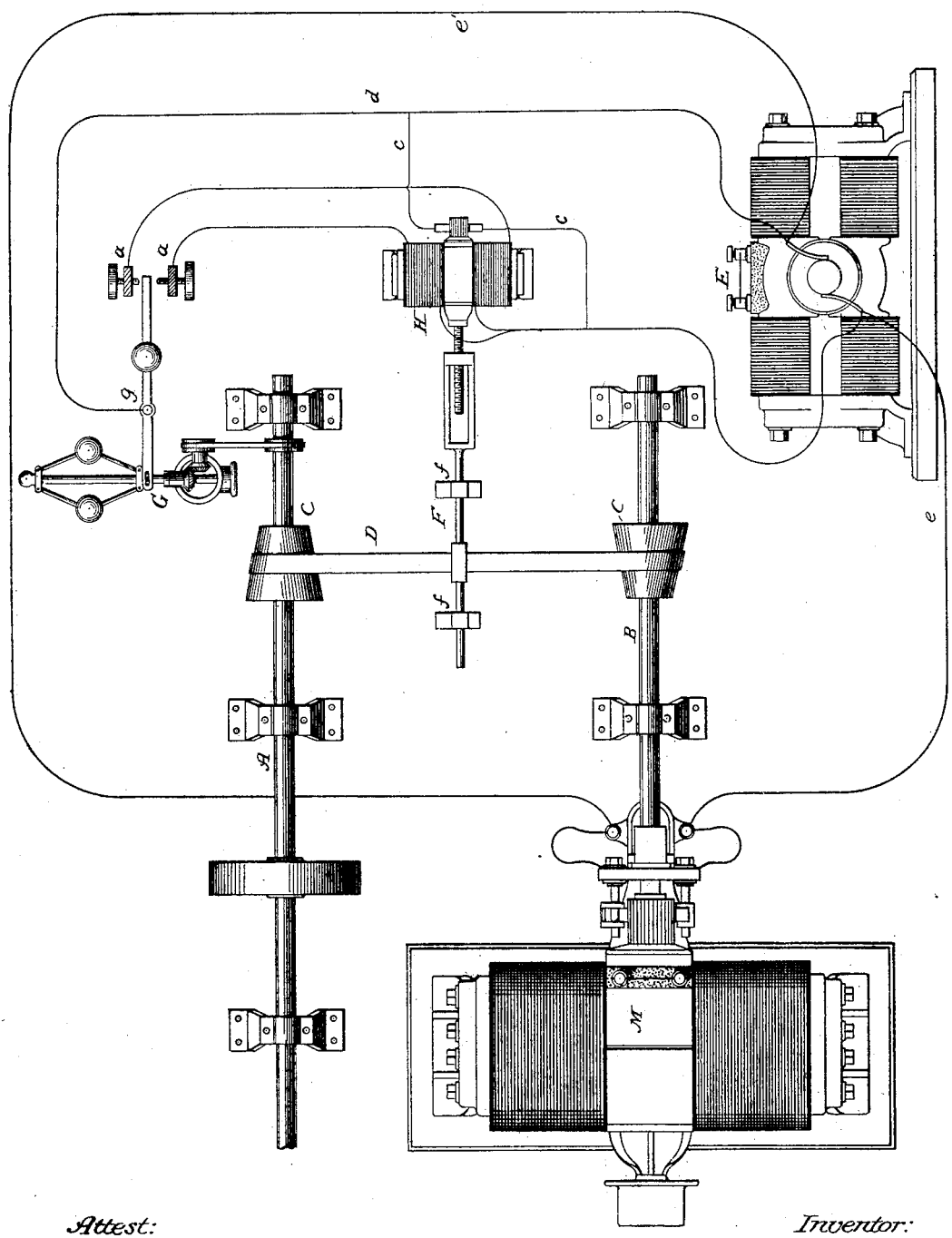

EDWARD WESTON, OF NEWARK, NEW JERSEY, ASSIGNOR TO THE UNITED STATES ELECTRIC LIGHTING COMPANY, OF NEW YORK, N. Y.

DEVICE FOR REGULATING THE ELECTRICAL TRANSMISSION OF POWER.

SPECIFICATION forming part of Letters Patent No. 272,362, dated February 13, 1883.

Application filed November 2, 1882. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Devices for Regulating the Electrical Transmission of Power, of which the following is a specification, reference being had to the drawing accompanying and forming a part of the same.

In other applications filed by me I have shown and described a combination, with a motor, a driven shaft or machine, and devices for transmitting motion from one to the other, of certain apparatus for varying the action or effect of the said motion-transmitting devices, whereby the speed of the driven machine is maintained practically uniform, while that of the motor is permitted to vary. Apparatus for effecting this purpose, of two general kinds, (mechanical and electrical) has already been shown and described.

In my present application I shall, after pointing out the general theory upon which the invention depends, describe a third species of regulating apparatus for varying the action of the motion-transmitting devices, in which both mechanical and electrical devices act conjointly, the one controlling the action of the other. The speed of an electric motor in a circuit from a dynamo-electric machine varies with the load put upon it. If, for example, the electromotor is employed to drive a line-shaft from which several machines are driven, whenever one or more of the machines driven by the line-shaft are disconnected therefrom, the load upon the motor is diminished and its speed of rotation tends to correspondingly increase. A serious drawback has hitherto presented itself to the employment of motors for driving shafts or machines on this account, and a remedy has been sought by controlling the speed of the motor in various ways. When an electro-magnetic motor is included in the circuit with a dynamo-electric generator it develops in the circuit an electro-motive force opposed to that of the generator. Assuming, by way of illustration, that the generator and motor are of the same character and capacity, and disregarding entirely the retarding effects of friction, the resistance of the conductors connecting the two machines, and also the internal resistance of the machines themselves, it is evident that, so long as the electromotive force of the generator preponderates over the counter electro-motive force of the motor, an amount of current energy represented by the difference of the two electromotive forces will be transformed into the work of revolving the armature of the motor. The speed of the driven machine or motor will, in consequence, be increased, the tendency being toward the attainment of that rate of speed necessary to make its electro-motive force equal to that of the generator. If the motor is now made to do some work—as, for example, to drive another machine—its speed of rotation, and consequently its counter electro-motive force, fall, and there is an increase in the amount of current energy manifested, which increase is proportionate to the amount of the added work. As a matter of fact, the disturbing elements of friction and resistance affect, to a greater or less extent, this law of operation, without, however, changing materially the general result; and it is evident from the above that the motor, if permitted to vary its speed of rotation according to the amount of work put upon it, is capable of automatically governing the amount of current flowing, or, more properly speaking, the amount of current energy transformed into work. By my invention this capacity of the motor is made use of as the means of automatically governing the amount of current energy transformed or expended, and I effect this result by operating on the motion transmitting devices that connect the motor with the machine or shaft driven thereby, varying the action or effect of said devices in such manner as to maintain the speed of the driven machine constant, while permitting the motor to revolve at a varying speed, that is determined by its load. My present invention involves means for accomplishing this result through the agency of both mechanical and electrical devices; and it consists in the combination, with the devices employed to transmit the motion of the motor to the driven shaft, of combined mechanical and electrical devices, which coact to vary the action or effect of said transmitting devices proportionately to variations in the load imposed upon the motor.

In the drawing hereto annexed the figure is designed as a diagram illustrative of the most practical means of which I am at present aware of carrying out the invention.

A is the driven shaft; B, the motor-shaft, or a shaft coupled direct with that of the motor.

C C are cone-pulleys, and D the belt running on them.

M designates the motor, and E a dynamo-electric machine, the current from which is carried by the conductors $e\ e'$ to the motor.

An ordinary centrifugal governor, G, is geared to the shaft A, and operates a pivoted lever, $g$.

F is a belt-shifter working in suitable guides, $f f$, and H is a small electro-magnetic motor having an extended screw-shaft, $h$, that connects with the belt-shifter F. The field of the motor is wound with two coils in opposite directions. One terminal of each coil is connected to stops $a\ a$ in the path of movement of the lever $g$. The remaining ends are joined and connected to one of the wires, $e$, of the main circuit. A wire, $d$, from the opposite wire, $e'$, is led to the lever $g$, so that when the latter is shifted by the governor G beyond a predetermined limit up or down the circuit will be closed through the field of the motor. The coils on this are of very high resistance, so that but little current at any time flows through the derived circuit in which they are included. A circuit of high resistance, $c\ c$, derived from the circuit $d\ d$, includes the armature-coils of the motor H.

The circuits are formed and the adjustments made at the outset in such manner that an increase in the speed above a certain limit will bring the lever $g$ into contact with the lower stop $a$. This will cause the motor H to shift the belt over toward the smaller end of the motor-pulley. On the contrary, should the speed of the motor fall below a predetermined point, the lever $g$, by contact with the upper stop $a$, causes the motor H to revolve in an opposite direction, and draws the belt over toward the larger end of the motor-pulley. In this way the speed of the motor varies, while that of the shaft A remains practically unchanged.

It is evident that many equivalent devices may be substituted for the governor and shifting motor herein described without departing from the spirit of the invention. Such substitutions, however, as ordinary magnets for the motor H, various forms of circuit-closers in lieu of that shown, and so on, I regard as obvious, and they are not, for this reason, illustrated more fully.

Having now described my invention, what I claim is—

1. In systems for the electrical transmission of power, the combination, with an electric motor, a driven machine, and motion-transmitting devices connecting the same, of an electric regulating device for varying the action or effect of the motion-transmitting devices, and a circuit-closer in the circuit with the regulating device, the operation of which depends upon the speed of rotation of the motor, substantially as herein set forth.

2. In a system for the electrical transmission of power, the combination, with an electric motor, a driven machine, and a connecting device consisting of a belt and cone-pulleys, of an electric belt-shifting mechanism and a circuit-closer therefor, operated by the rotation of the driven shaft in substantially the manner set forth.

3. The combination, with the cone-pulleys and the belt D, of shifter F, motor H, having its field wound with two conductors in opposite directions, the circuit-closer, and centrifugal governor in gear with the shaft driven by the belt, as set forth.

In testimony whereof I have hereunto set my hand this 30th day of October, 1882.

EDWARD WESTON.

Witnesses:
HENRY A. BECKMEYER,
JOHN P. DENGLER.